Sept. 9, 1969  G. H. ROBERTSON  3,466,540
ANALYSIS OF TIME-SEGMENTED WAVES
Filed May 1, 1963
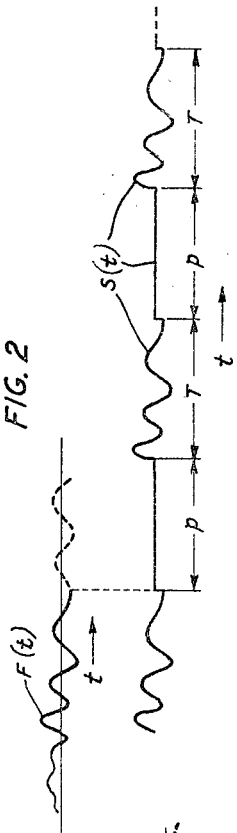
FIG. 2
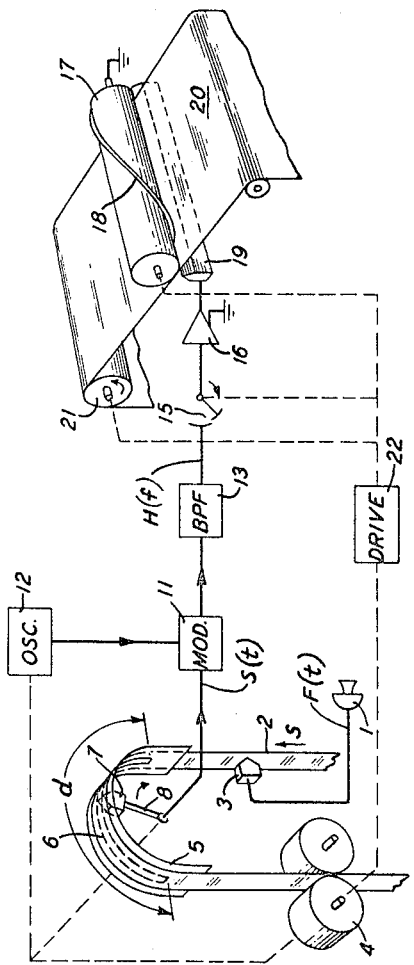
FIG. 1
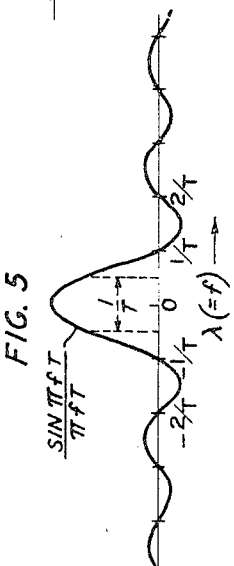
FIG. 5
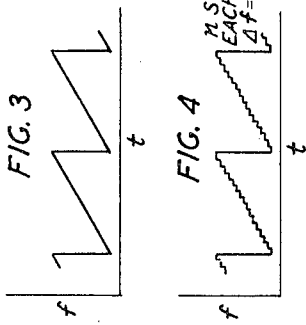
FIG. 3
FIG. 4
INVENTOR
G. H. ROBERTSON
BY
Harry C. Hart
ATTORNEY United States Patent Office 3,466,540
Patented Sept. 9, 1969

3,466,540
ANALYSIS OF TIME-SEGMENTED WAVES
George H. Robertson, Summit, N.J., assignor to Bell Telephone Laboratories, Incorporated, New York, N.Y., a corporation of New York
Filed May 1, 1963, Ser. No. 277,673
Int. Cl. G01r 23/16, 27/02
U.S. Cl. 324—77                                    6 Claims This invention deals with the analysis of complex waves, electrical, mechanical or acoustical, to determine their spectral compositions. Its principal object is to improve the uniformity of response of spectrographic apparatus over the frequency range for which it is designed.

Spectrographic apparatus for waves of this kind is of several different types, embodying several different principles. In a large class of such apparatus the wave to be analyzed, or a segment of it, is first stored or recorded and the segment thus captured is then repeatedly read out of store, each repetition following immediately on the heels of its predecessor. Each such repetition is examined, with the aid of an analyzing filter, for a single one of the frequency components of interest. Thus, if each of $n$ different frequency components are to be distinguished from all of the others, $n$ repetitions of the read-out are required.

In some apparatus the initial storage is only of a segment of the wave, in which case each of the repeated read-outs is identical with all of the others. After the analysis is complete, a new segment of the wave is stored and the process is repeated. This approach, exemplified by Potter 2,403,997 and Potter 2,463,642, is open to the objection that the segments thus successively stored may differ widely from each other. This difficulty is avoided by storing the entire wave of interest as it progresses and slightly advancing the stored wave between each read-out and the next. This technique, exemplified by Lacy 2,403,986 and Meacham 3,021,478, avoids abruptness of transition from one captured time segment to the next at the price of introducing a small and unimportant difference between each time segment recovered from the store and its predecessor.

Whatever the nature of the store and the technique employed for read-out, the analyzing filter may itself be returned between each read-out and the next as in Potter 2,463,642. It is generally preferable, however, to employ a fixed filter in cooperation with a variable frequency oscillator and a modulator as in Lacy 2,403,986, Potter 2,403,997 and Meacham 3,021,478. In apparatus of this kind the wave derived from the stored segment is intermodulated with the output of the sweep frequency oscillator to develop modulation products among which are those of beat frequencies. These are together applied to the fixed analyzing filter; and the beat frequency components which the latter selects are representative of, although not identical to, corresponding frequency components of the wave constituted of the successive repetitions of the stored segment.

It is an object of the invention to ensure that the several components thus developed by segmentation, repetition and analysis shall be representative, as nearly as possible, of the constitution of the incoming wave. The manner in which this object is attained will appear from the following considerations.

Any periodic wave may be broken down into a set of sinusoidal components in accordance with the Fourier theorem. Likewise in accordance with that theorem, and as set forth by Lord Rayleigh in his "Theory of Sound" (Dover, 1945) page 25, when a wave, defined over an interval T is immediately repeated, the successive Fourier components are spaced apart on the frequency scale at intervals $1/T$. Accordingly, it is normal in the design of such apparatus so to proportion the analyzing filter that its effective bandwidth is likewise equal to $1/T$. In principle, the filter can thus examine all of the Fourier components, one by one, each without interference from its neighbors. This approach is fully expounded in the Meacham patent, above referred to. But, of course, the components that are really wanted are those of the incoming wave itself. Those of an artificial wave constructed of a sequence of repetitions, at intervals T, of a single segment of the real wave are of interest only insofar as they may be representative of those of the real wave, which may, in fact, fall at frequencies midway between two adjacent members of the set of Fourier components into which the artificial wave is resolved. No such component can be recovered by ordinary techniques. While such a component can be recovered by doubling the length of the repeated segment and so halving the interval between the adjacent recovered components, this is not a practical solution since, with a good design, the segment length chosen will already be as long as can be tolerated from the standpoints of complexity and cost of apparatus and speed of its operation. Furthermore, and aside from such apparatus considerations, there are objections to an indefinite extension of the derived segment for the reason that, in situations of practical interest, the real incoming wave is usually not completely steady but fluctuates in various ways as time progresses. Accordingly, if the segment selected for analysis be unduly long, that portion of the real wave embraced within it may differ markedly between one end of the segment and the other end and, indeed, in such a way that the influence of the earlier portion on the analyzing filter may tend to offset the influence of the later portion. Thus, while considerations of fineness of analysis call for a longer segment, practical considerations call for a shorter one.

The invention is predicated on the realization that the spacing among the harmonic components depends only on the duration of the repetition period and not on the length of the segment repeated in this period, while the distribution among the amplitudes of these components—i.e., their envelope—depends on the length of the segment and is independent of the repetition period. Stated in another way, the invention is predicated on the recognition that there is no need, in principle, that the captured segment should endure throughout the repetition period and that, indeed, advantages may accrue from the selection of a segment length that is substantially shorter than the repetition period—i.e., from the introduction of a gap or pause between each repetition of the captured segment and the following one. Ideally, indeed, the pause $p$ should be substantially longer than the segment length but, as a practical matter, once the pause has attained the same duration T as the segment, so that the entire period P, constituted of a segment of length T followed by a pause $p$ of the same duration, has attained the length $P=2T$ or slightly longer, further gains due to making the pause much longer are minimal and are more than offset by the consequent reduction of available energy.

Accordingly, the optimal arrangement is one in which each segment of length T is followed by a pause of the same or somewhat greater duration. The repetition period being twice the segment length or somewhat longer, i.e., $P \geq 2T$, the harmonic components which result from the analysis of the repeated segments are spaced apart on the frequency scale by intervals $1/2T$ or less. At the same time, the original envelope of these components, determined by the length T of the segment, in contrast to the length P of the period, is unchanged. In consequence, the resulting spectrum envelope is smoother, by a factor two, than it would be if the recovered segment had been permitted to endure throughout the period. It turns out from analysis, summarized below, that the smoothness of the spectrum envelope is such that it most rapid fluctuation embraces at least two adjacent members of this harmonic series. In accordance with the Sampling Theorem as expounded, for example, by E. T. Whittaker in a monograph entitled "On the Functions Which Are Represented by the Expansions of the Interpolation Theory" published in the Proceedings of the Royal Society of Edinburgh for July 1915, vol. 35, pp. 181–194, the set of spectrum components thus derived suffice completely to define the spectrum envelope in a fashion which would be impossible were the envelope oscillations to be twice as rapid, as would be the case with a segment that endures throughout the period, or if the spectral components were to be half as numerous, as would be the case if the period were shortened to coincide in duration with the segment.

To distinguish each such Fourier component or spectrum sample from its neighbors, the effective bandwidth of the analyzing filter must evidently be equal to the interval between adjacent spectral components; i.e., $$B = 1/P$$

Employment of this filter for the recovery, one by one, of all of the components within a frequency range R of interest evidently requires a number $n$ of repetitions that is equal to the ratio of the range R to the effective filter bandwidth B; i.e., $$n = R/B$$

The "ringing time" $T_R$ of a filter—i.e., the time required for its response to a transient signal to come to within a preassigned fraction of its final value, is the reciprocal of its bandwidth; thus $$T_R = 1/B = P$$

Thus the invention coordinates the bandwidth and the ringing time of the analyzing filter, not with the length T of the wave segment, but rather with the duration $P \geq 2T$ of the repetition period. By the end of each repetition of the recovered wave segment the filter will thus have had an opportunity, during an interval including the preceding gap or pause, to "forget" the influence of the prior wave segment and so to acquire, during the recovery of the current wave segment, a true indication of the energy associated with that particular frequency component currently under examination, unhindered by a "recollection" of the energy of another component examined in the course of the prior repetition.

The invention will be fully apprehended from the following detailed description of an illustrative embodiment thereof taken in connection with the appended drawings in which:

FIG. 1 is a schematic diagram of apparatus embodying the invention;

FIG. 3 and 4 are diagrams showing alternative modes of variation of the frequency of the heterodyne oscillator of FIG. 1; and FIGS. 2 and 5 are explanatory diagrams of assistance in the exposition of a feature of the invention.

Referring now to the drawings, FIG. 1 shows, in schematic form, apparatus adopted from the Meacham patent above referred to, and modified to adapt it to the purposes of the invention. An incoming wave $F(t)$, e.g., a sound wave to be analyzed, and illustrated in FIG. 2, is recovered and converted into an electrical wave by a microphone 1, is continuously stored as it arrives. As a practical matter the storage, as well as the read-out to be later described, may advantageously be instrumented with a delay line time compressor or "DELTIC" as described by W. W. Scanlon and G. Lieberman in a monograph published in the Proceedings of the Institute of Radio Engineers for May 1959, vol. 47, page 910 ff. and especially at page 919. For ease of illustration and description, however, the store is in the form of a record on a suitable medium such as a magnetic tape 2 onto which the incoming wave is continuously applied by means of a recording head 3 of known construction, past which the tape is advanced, e.g., by rollers 4 at a speed $s$. Placed immediately beyond the recording head is an arcuate track 5 over which the tape 2 travels. This track defines the length $d$ of the tape segment 6 to be scanned, and hence the duration $T = d/s$ of the wave segment to be analyzed. The track extends through an arc of 180 degrees or a semicircle and the reproducing scanner 7 is mounted at the end of a radial arm 8 which rotates about an axis located at the center of the arc. Accordingly, during one half of each revolution it picks off the tape a time-domain counterpart of the wave segment there recorded, while during the second half of each revolution, the output of the head 7 is of zero amplitude. The resulting artificial wave $S(t)$, constituted of segments interspersed with pauses, is shown in the lower part of FIG. 2. The length of the captured tape segment being T, the repetition period P of the wave derived by the scanner 7 is 2T and, accordingly, the Fourier components of the repeated, segmented, derived wave are spaced apart on the frequency scale by intervals $1/2T$.

Alternatively, the track 5 may extend through a shorter arc; e.g., an arc of 120 degrees, in which case the duration $p$ of the pause between successive repetitions of the wave segment is of twice the duration T of each segment, and the whole repetition period becomes $$P = p + T = 3T$$

In accordance with known techniques, the track 5 over which the tape segment 6 passes may contain a central slot which extends for its full length and nearly its full width. The scanning head 7 may thus be brought into close proximity with the surface of the tape on which the wave is recorded.

The output of the head 7 is fed to a modulator 11 of known construction to which is also fed a beating signal of frequency $f_c$ derived from an oscillator 12. The oscillator is of the sweep frequency variety such that its output frequency $f_c$ changes steadily, following a sawtooth wave as shown in FIG. 3, from a lower limit to an upper limit and returns abruptly to its lower limit to repeat the cycle. This may be provided for in well-known fashion by such means as a rotary tuning condenser. If preferred, the oscillator frequency may be altered in small, discrete steps, as shown in FIG. 4.

The output of the modulator 11, which includes the modulation products of the instantaneous oscillator frequency with various component frequencies in the output of the pickup head 7, is next applied to a bandpass filter 13, having an attenuation frequency characteristic of conventional form, and having a midband frequency $f_0$ lying in the frequency range of the beats between the instantaneous oscillator frequency at some point in its sweep and a desired one of the components derived from the pickup head 7. The bandwidth of this filter 13 will be discussed in detail below.

The filter output is connected to a sampler 15 which as a practical matter may be an electronic device of known construction but which is here schematically represented for the sake of simplicity as a rotary mechanical member which provides a momentary connection, conductive or capacitive. This connection should endure throughout at least a full cycle at the beat frequency $f_0$. The output of the sampler 15 is applied, by way of an amplifier 16, to a plotter which again may be of any desired variety, but which for the sake of specific illustration is shown as of the so-called "lawn mower" variety in which a cylinder 17 having a helical ridge 18 making a single turn around it between one end of the cylinder and the other end is juxtaposed with a stationary straight narrow electrode 19 parallel to the axis of the cylinder 17, a strip of appropriately sensitized paper 20 passing between them. This paper may be treated, for example, with a titanium-oxide-carbon compound in a fashion to render it sensitive to an electric discharge between the straight electrode 19 and the ridge 18 of the cylinder 17. A suitable paper is the so-called "teledeltos" facsimile paper of Western Union Telegraph Company. This paper strip is continuously advanced by a roller 21 under the control of the mechanical drive unit 22, in a direction normal to the axis of the cylinder 17.

The rotation of the scanner arm 8 is synchronized with that of the sampler 15 in such a fashion that the output of the filter 13 is sampled once and only once during each passage of a scanning head 7 over the tape segment 6. Similarly the rotation of the plotter cylinder 17 is synchronized with the frequency sweep of the oscillator 12 in such fashion that the cylinder 17 makes one revolution for each full cycle of the oscillator frequency variation. The phases of these operations are adjusted so that, at the start of the oscillator frequency sweep the point of closest proximity between the helical ridge 18 and the straight electrode 19 lies at one margin of the paper strip 20 while at the end of the frequency sweep the point of closest proximity lies at the other margin of the strip. Also the sampler 15 is phased with respect to the scanner arm 8 in a fashion to gate the filter 13 to the plotter electrode 19 at the instant of maximum response to the most recently scanned record segment. Lastly, the rates of the scanner 8 and the sampler 15, on the one hand, are preferably related to those of the oscillator frequency sweep and the plotter, on the other hand, in such fashion that the tape segment 6 is scanned a fairly large number $n$ of times in the course of each full frequency sweep. These synchronization requirements may conveniently be met by the provision of a common mechanical drive unit 22 of any desired variety.

To summarize the operation of the apparatus described above, the signal to be analyzed is first recorded on the tape 2. A segment 6 of this record of length $d$, and bearing a wave segment of duration T, is scanned, advantageously, at a high speed $v$, by the pickup head 7 to derive a time-domain counterpart of the wave segment and of effective duration T. This is immediately followed by a gap or pause $p$ of the same or somewhat greater effective duration T in the output of the scanner 7 while it travels from the exit end of the track 5 to the entrance end. This scanning operation is repeated a number $n$ of times during which the record tape 2 moves at the lower speed $s$, through the full length $d$ of the track 5. For each such scan the output frequency of the oscillator 12 has some value $f_c$ such that the modulation product of this frequency with some particular component (or narrow band of components) of the signal reproduced from the tape segment lies within the pass band of the filter 13. The filter output is, therefore, proportional to the energy of this component. It is sampled at the instant of maximum response of the filter 13 to the most recently scanned record segment 6 to apply to the plotter electrode 19 a pulse of energy which is similarly proportional to the same component. An electric discharge whose intensity is therefore approximately proportional to the energy of this component takes place between the straight electrode 19 and the helical ridge 18 of the plotter and forms an impression or mark on the paper 20 whose density is an indication of the magnitude of the energy of the component in question. This mark is located on the paper at a distance along its length as determined by the steady advance of the paper strip 20 and at a distance across its width as determined by the phase of the rotation of the cylinder 17. This phase being coordinated with the oscillator frequency sweep as described above, the lateral distance across the tape at which this mark appears may be taken as an indication of the frequency of the component in question.

In order that the scanner 7 shall make the required number $n$ of passes around the track 5 while the tape 2 advances from one end of the track to the other, the speed $v$ of the scanner 7 must evidently be $n$ times as great as the speed $s$ with which the tape 2 advances along the track 5. Advantageously, the scanning speed $v$ is so great that the much smaller speed $s$ of tape advance may yet be as great as the speed with which the wave $F(t)$ is recorded. This permits the operations of segment recovery and analysis to be carried out concurrently with the recording operation.

As is well known, the speed ratio $v/s$ results in a compression of the time scale of the wave recovered by the scanner 7, as compared with the time scale of the original wave $F(t)$ and in a corresponding expansion of the frequency scale. Hence, as a practical matter, the bandwidth of the analyzing filter 13 is to be coordinated with the expanded frequency scale. But such time compression and frequency expansion are incidental to the present invention. For clarity of exposition, therefore, it is preferable to refer the bandwidth of the filter 13 to the original time and frequency scales. On this basis, its effective bandwidth B is such that it can select a single one of the harmonics, to the exclusion of neighboring ones. Also, the sweep of the frequency of the local oscillator should be such as to shift its effective midband frequency from each harmonic to the next, between each scan and the next. Hence the scan-to-scan change $\Delta f$, in the oscillator frequency should be equal to the bandwidth of the analyzing filter, and both should be equal to the harmonic spacing; i.e., $$\Delta f = B = 1/P$$

This filter operates to select from the infinite series of such harmonic components those that are included in the frequency range R, picking one in each of $n$ repetitions of the stored wave segment. For this purpose the number of repetitions required is $$n = R/B$$

Following the usual convention, the filter bandwidth may be defined as the separation between two frequencies, above and below the midband frequency, for which it interposes a loss that exceeds the midband loss by 3 decibels. On this understanding its "ringing time," $T_R$, i.e., the time required for its response to a transient to reach to within 20 percent of its final value, is the reciprocal of its bandwidth; i.e., $$T_R = 1/B = P$$

Thus the invention coordinates the bandwidth and the ringing time of the analyzing filter not with the length T of the wave segment but rather with the duration P of the repetition period.

Theoretical considerations

The invention was arrived at through the following theoretical considerations:

Designating the incoming wave which, in general, changes with the progress of time by $F(t)$; its spectrum is the Fourier transform of $F(t)$, namely $$G(f) = \int_{-\infty}^{\infty} F(t) e^{-i2\pi f t} dt \qquad (1)$$

Because of the infinite limits of integration, $G(f)$ is not fully defined until $F(t)$ shall have completed its full course. Hence it is impossible for a mechanism to provide a faithful rendition of $G(f)$ concurrently with the development of $F(t)$.

Thus the first question faced by the designer is: What stratagem can be employed to obtain a useful approximation to $F(t)$? The chopping of the wave $F(t)$ into segments of finite duration and the analysis of the segments one by one is such a stratagem. The next question is: How can one have confidence that the approximation is the best possible? Indeed, what assurance is there that it is even a good one?

A single wave segment, of duration T, that is chopped out of the continually developing wave $F(t)$ may be represented as the product of modulation or multiplication of $F(t)$ by a square wave $\Delta(t)$ which attains unit amplitude throughout an interval of duration T and is zero at all other times. I.e., the wave segment is given by $$S_1(t) = F(t) \cdot \Delta(t)$$

where $$\Delta(t) = 1 \text{ if } -\frac{T}{2} \leq t \leq +\frac{T}{2}$$
$$= 0 \text{ otherwise,} \quad (2)$$

the origin of time being taken, for ease of later manipulations, at the midpoint of the interval T.

The spectrum of this wave segment $S_1(t)$ is given by its Fourier transform, namely $$H(f) = \int_{-\infty}^{\infty} F(t) \cdot \Delta(t) e^{-i2\pi ft} dt \quad (3)$$

Inasmuch as the Fourier transform of a product is equal to the convolution of the Fourier transforms of its factors, and since the transform of $\Delta(t)$ is $$\int_{-\infty}^{\infty} \Delta(t) e^{-i2\pi ft} dt = \frac{\sin \pi ft}{\pi ft} \quad (4)$$

Equation 3 may be rewritten as $$H(f) = T \int_{-\infty}^{\infty} G(f-\lambda) \left[ \sin \pi T \lambda \right] d\lambda \quad (5)$$

$$= T \int_{-\infty}^{\infty} G(\lambda) \left[ \frac{\sin \pi T(f-\lambda)}{\pi T(f-\lambda)} \right] d\lambda \quad (6)$$

Equations 5 and 6, which are wholly equivalent, show that the spectrum $H(f)$ of the wave segment $S_1(t)$ may be regarded as a weighted average of the spectrum $G(f)$ of the real wave, the weighting function being the Fourier transform of the modulating function $\Delta(t)$. In more graphic terms, Equations 5 and 6 show that the spectrum $H(f)$ has the appearance of the desired spectrum $G(f)$ as seen, not all together, but through a "window" having the configuration of a sin $x/x$ curve in which $x = \pi fT$, and which sweeps across the spectrum $G(f)$ in the frequency dimension. FIG. 5 depicts such a window, plotted as a function of $\lambda$ (or $f$).

It is well recognized in certain fields, notably the field of television engineering, that the sweeping of a rectangular aperture or window of width W across a pattern or scene acts to obscure all details of which the wavelengths are W or shorter, while preserving those of longer wavelengths. Similarly, the effect of sweeping the window of FIG. 5 across the true spectrum $G(f)$ depends on the effective width of the window, and acts to obscure or suppress fluctuations of the spectrum $G(f)$ of which the wavelengths are equal to or shorter than this width while preserving the fluctuations of longer wavelengths.

The effective width W of the window of FIG. 5 may be defined as the actual width of an equivalent rectangular window. To determine such an equivalent window, the curve of FIG. 5 may be integrated throughout its entire extent, to give the area under it, and this area may be equated to that within the equivalent rectangle; i.e., under the rectangular curve bounding the equivalent window. While the actual evaluation presents a formidable problem of contour integration in the complex plane, it is a problem that has frequently arisen and has been solved. The solution is a standard item for inclusion in tables of integrals, where it is usually presented in the form $$\int_0^{\infty} \frac{\sin x}{x} = \frac{\pi}{2} \quad (7)$$

Because of the symmetry of the curve of FIG. 5, it follows that $$\int_{-\infty}^{\infty} \frac{\sin x}{x} = \pi \quad (8)$$

wherefore, with a change of scale from $x$ to $\lambda$ (or $f$), it follows that the effective width W of the sin $x/x$ window of FIG. 5 is $$W = \frac{1}{T} \quad (9)$$

While this result can be rigorously established with the aid of contour integration, it is immediately apparent from the following considerations that it is not far from the truth. The primary side lobes of FIG. 5 are 14 decibels lower in amplitude than the main lobe, and those of higher order are still lower. Furthermore, all the side lobes alternate in polarity. Their contributions to the outcome are thus small, and may for the present be disregarded. The first zero points on opposite sides of the main lobe of FIG. 5 are located at $$\lambda = -\frac{1}{T}$$

and $$\lambda = +\frac{1}{T}$$

Hence the width of the main lobe of the window at its widest, i.e., on the axis, is $2/T$. At an amplitude of $2/\pi = 0.64$, i.e., nearly two thirds, of its peak amplitude, its width is half as great, i.e., $1/T$. Because substantially two thirds, or more, of incident energy can pass through this central part of the window, of width $1/T$, while only a much smaller amount can pass through its lower amplitude lateral parts, the effective width of the window, i.e., that of an equivalent rectangular window of uniform width, evidently does not differ greatly from $$W = 1/T$$

It follows that the effect of sweeping the sin $x/x$ window of FIG. 5 past the true spectrum $G(f)$ is that the true spectrum $G(f)$ is shorn of its finer details, to leave, in the approximate spectrum $H(f)$ only the features of which the fluctuation wavelengths are W or longer. In other words, the effect of the convolution is to smooth or "smear" the true spectrum by eliminating the fluctuations of short wavelength or high "frequency," preserving the longer ones. Now it is established by the Sampling Theorem that if a curve, smoothed to this extent, is to be specified by its values at a sequence of regular sampling points, $S_1, S_2, \ldots$ the intervals $\Delta S$ between successive samples must be no greater than $$\Delta S = W/2 = 1/2T$$

and, moreover, that a set of samples at these intervals suffice to specify it completely.

Given a single wave segment $S_1(t)$, a number $n$ of repetitions of it, at regular intervals P, may be expressed as $$S(t) = \sum_{m=0}^{m=n} S_1(t + mP) \quad (10)$$

wherein, because each repetition is either identical with its predecessor or closely resembles it, $$S(t + (m+1)P) \doteq S(t + mP)$$

Because of the periodic character of the repeated wave $S(t)$, its spectrum is a "line" spectrum of discretely different Fourier harmonic components that are spaced apart on the frequency scale at intervals $1/P$; i.e., at intervals $1/2T$ or less. Regarded as a set of samples of the spectrum $H(f)$, these harmonics evidently satisfy the requirements of the Sampling Theorem: There are at least two of them for each full wavelength of the most rapid fluctuation in the spectrum $H(f)$. Thus the analyzing filter of effective bandwidth $$B = 1/2T$$

which evaluates them one by one, as its effective location on the frequency scale is shifted from each harmonic to the next, provides a true representation of the spectrum $H(f)$ and so the best possible approximation to the desired spectrum $G(f)$.

What is claimed is:

1. Apparatus for analyzing an incoming complex wave having components in a frequency range R to determine its composition which comprises means for storing at least a portion of said wave as it arrives, means for recovering from storage a wave segment of effective duration T, means for repeating said recovery $n-1$ times, at intervals 2T, whereby a gap of duration T is introduced between each recovered wave segment and the following one an analyzing filter of effective bandwidth $$B=R/n=1/2T$$

and of effectively variable midband frequency, means including said filter for examining each of the successive recovered segments over one of a succession of $n=R/B$ contiguous subbands, each of which B, means for deriving a measure of the energy stored in said filter once for each recovered segment, and means for presenting the magnitudes of said measures in time-frequency coordinates.

2. Apparatus for analyzing an incoming complex wave to determine its spectral composition which comprises means for storing at least a portion of said wave as it arrives, means for recovering from storage a wave segment of effective duration T, means for repeating said recovery $n-1$ times, at intervals 2T, thus to introduce a gap of duration T between each recovered wave segment and the following one, a source of a sinusoidal reference oscillation of a frequency that is variable through a range equal to the frequency range R of interest, means for altering the oscillation frequency of said source by an increment $R/n$ for each recovered segment, means for intermodulating said recovered wave segments with said reference oscillation to develop beat frequency modulation products, an analyzing filter of midband frequency in the range of said beat frequencies and of effective bandwidth $$B=R/n=1/2T$$

connections for applying said modulation products to said filter, means for deriving a measure of the energy stored in said filter once for each recovered segment, and means for indicating the magnitudes of said measures in time-frequency coordinates.

3. Apparatus for analyzing an incoming wave which comprises, an elongated sensitive medium, means for continuously storing a record of said wave on said medium, a semicircular track of preassigned length, means for advancing said medium, bearing said record, along said track at a lower speed, said track thus defining a segment of said record, a single pickup device mounted for rotation about the center of the circle defined by said track and at the outer end of a radius of said circle, means for rotating said device about said center at a higher speed to develop, in one half of each revolution of said device, a time-compressed counterpart of the record segment defined by said track and, in the remaining half of each revolution, a signal of zero magnitude, thus to deliver, in the course of consecutive revolutions, an artificial periodic wave constituted of successive wave segments of like durations interspersed with pauses of the same durations, and means for determining the several harmonic components of said artificial wave.

4. Apparatus for determining the spectral composition of an incoming wave which comprises means for storing said wave, means for recovering from store an artificial wave constituted of a succession of substantially like wave segments, each of duration T. interspersed with pauses of the same duration, the repetition period of said artificial wave being thus $$P=2T$$

and means for individually determining the discretely different Fourier components of said artificial wave, said components being separated on the frequency scale by intervals $$\Delta f=1/2T$$

5. Apparatus for developing an approximate indication of the spectrum G(f) of an incoming wave F(t) which comprises means for deriving from said wave a wave segment of duration T having a continuous spectrum H(f) characterized by fluctuations, means for repeating said derivation $n-1$ times, means for introducing a pause of duration p between each derived wave segment and the following one, thus to generate an artificial periodic wave of period $P=p+T$, and characterized by a spectrum consisting of a series of n discretely different Fourier components, of which the frequencies are the repetition rate and its harmonics, means for analyzing said artificial periodic wave to recover its Fourier components individually, and means for adjusting the duration p of each pause to satisfy the relation $p>T$, thus to provide the period P of the artificial wave with a duration of at least twice the duration T of the wave segment, whereby each fluctuation of the continuous spectrum of said wave segments embraces at least two adjacent ones of said Fourier components, and means for presenting said recovered Fourier components in time-frequency coordinates.

6. Apparatus for developing an approximate indication of the spectrum G(f) of an incoming wave F(t) which comprises means for deriving from said wave a wave segment of duration T having a continuous spectrum H(f) characterized by fluctuations, means for repeating said derivation $n-1$ times, means for introducing a pause of duration p between each derived wave segment and the following one, thus to generate an artificial periodic wave of period $P=p+T$, and characterized by a spectrum consisting of a series of n discretely different Fourier components, of which the frequencies are the repetition rate and its harmonics, means for analyzing said artificial periodic wave to recover its Fourier components individually, and means for adjusting the duration p of each pause to satisfy the relation $p \geq T$, thus to provide the period P of the artificial wave with a duration of at least twice the duration T of the wave segment, whereby the requirements of the Sampling Theorem are satisfied as between the continuous spectrum of a single wave segment and the Fourier components of the repeated wave segments, and means for presenting said recovered Fourier components in time-frequency coordinates.

No references cited.

RODNEY D. BENNETT, JR., Primary Examiner

C. W. WANDS, Assistant Examiner